United States Patent
Bhatia et al.

(10) Patent No.: US 9,811,481 B2
(45) Date of Patent: Nov. 7, 2017

(54) DISTRIBUTED INTELLIGENT PLATFORM MANAGEMENT INTERFACE (D-IPMI) SYSTEM AND METHOD THEREOF

(71) Applicant: AMERICAN MEGATRENDS, INC., Norcross, GA (US)

(72) Inventors: Anurag Bhatia, Liburn, GA (US); Sanjoy Maity, Snellville, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 277 days.

(21) Appl. No.: 14/700,843

(22) Filed: Apr. 30, 2015

(65) Prior Publication Data

US 2016/0321197 A1 Nov. 3, 2016

(51) Int. Cl.
*G06F 13/16* (2006.01)
*G06F 11/30* (2006.01)
(Continued)

(52) U.S. Cl.
CPC ........ *G06F 13/1652* (2013.01); *G06F 1/3206* (2013.01); *G06F 11/3006* (2013.01); *G06F 13/4068* (2013.01)

(58) Field of Classification Search
CPC .. G06F 1/3206; G06F 1/3209; G06F 11/3003; G06F 11/3006; G06F 11/3055;
(Continued)

(56) References Cited

U.S. PATENT DOCUMENTS

2005/0198601 A1* 9/2005 Kuang ................ G06F 17/5022
716/108
2007/0055793 A1* 3/2007 Huang .................. G06F 13/102
710/8

(Continued)

OTHER PUBLICATIONS

"Intelligent Platform Management Interface Specification Second Generation". Version 2.0. Document Revision 1.1. Oct. 1, 2013. Intel Corporation et al.*

*Primary Examiner* — Thomas J Cleary
(74) *Attorney, Agent, or Firm* — Locke Lord LLP; Tim Tingkang Xia, Esq.

(57) ABSTRACT

Certain aspects direct a distributed Intelligent Platform Management Interface (D-IPMI) system. The system includes a computing device and a distributed management device. The distributed management device includes a first management device and at least one second management device physically separated from each other. A stack interface connects the first management device and the second management device to perform an internal communication between the first management device and the second management device. The first management device may be used to perform time critical functions related to the computing device, and the second management device may be used to perform non-critical functions. For example, the first management device may perform system power control of the computing device, monitor system components and obtaining system information of the computing device, and perform system communication with the computing device.

(Continued)

The second management device may perform an external communication through the external interface.

25 Claims, 3 Drawing Sheets

(51) Int. Cl.
    *G06F 1/32*           (2006.01)
    *G06F 13/40*         (2006.01)

(58) Field of Classification Search
    CPC .. G06F 11/3058; G06F 11/3062; G06F 13/12; G06F 13/122; G06F 13/1652; G06F 13/40; G06F 13/4004; G06F 13/4027; G06F 13/4068
    See application file for complete search history.

(56) References Cited

U.S. PATENT DOCUMENTS

| | | | | |
|---|---|---|---|---|
| 2009/0182799 A1* | 7/2009 | Huang | ............... | H04L 12/24 |
| | | | | 709/201 |
| 2012/0151007 A1* | 6/2012 | Mescher | ............ | G06F 11/3006 |
| | | | | 709/219 |
| 2015/0304233 A1* | 10/2015 | Krishnamurthy | ..... | H04L 47/762 |
| | | | | 709/226 |
| 2016/0246754 A1* | 8/2016 | Rao | ............... | G06F 13/4286 |

* cited by examiner

DISTRIBUTED INTELLIGENT PLATFORM MANAGEMENT INTERFACE (D-IPMI) SYSTEM AND METHOD THEREOF

FIELD

The present disclosure relates generally to baseboard management technology, and more particularly to distributed Intelligent Platform Management Interface (D-IPMI) systems and methods thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Intelligent Platform Management Interface (IPMI) is an industry standard for system monitoring and event recovery. Currently, baseboard management controller (BMC) chips fully support the IPMI Specification version 2.0 (hereinafter the IPMI v2.0), which is publicly available from INTEL CORPORATION, and is incorporated herein by reference. The IPMI v2.0 provides a common message-based interface for accessing all of the manageable features in a compatible computer. However, with more IPMI based functionalities being put into the BMC, it becomes more challenging for all of the components running on the single BMC chip to meet the strict system requirements.

Therefore, an unaddressed need exists in the art to address the aforementioned deficiencies and inadequacies.

SUMMARY

Certain aspects of the disclosure direct to a distributed Intelligent Platform Management Interface (D-IPMI) system. In certain embodiments, the system includes a computing device and a distributed management device. The distributed management device includes a first management device, at least one second management device, and a stack interface connecting the first management device and the at least one second management device to perform an internal communication between the first management device and the second management device. The first management device includes a first processor, a system interface, and a first non-volatile memory storing first IPMI related computer executable code. The second management device includes a second processor, an external interface, and a second non-volatile memory storing second IPMI related computer executable code. The first IPMI related computer executable code, when executed at the first processor, is configured to perform a plurality of time critical functions related to the computing device; and perform the internal communication with the at least one second management device through the stack interface. The second IPMI related computer executable code, when executed at the second processor, is configured to: perform an external communication through the external interface; perform a plurality of non-critical functions related to the computing device; and perform the internal communication with the first management device through the stack interface.

In certain embodiments, the time critical functions related to the computing device includes: performing system power control of the computing device; monitoring system components of the computing device and obtaining system information of the computing device; and performing a system communication with the computing device through the system interface.

In certain embodiments, each of the first management device and the at least one second management device is a system on a chip (SoC) physically separated from each other.

In certain embodiments, the system interface is an IPMI standardized interface. In certain embodiments, the IPMI standardized interface includes a keyboard controller style (KCS) interface, a system management interface chip (SMIC) interface, and a block transfer (BT) interface.

In certain embodiments, the second IPMI related computer executable code, when executed at the second processor, is configured to perform the external communication with a remote computing device through the external interface.

In certain embodiments, the stack interface is an Inter-Integrated Circuit (I2C) interface, a system management bus (SMB) interface, or a local area network (LAN).

In certain embodiments, the second IPMI related computer executable code, when executed at the second processor, is further configured to: request the system information of the computing device from the first management device through the stack interface; and receive the requested system information of the computing device from the first management device through the stack interface.

In certain embodiments, the first processor is an external processor of the computing device and shared by the first management device, and the first non-volatile memory is a non-volatile memory of the computing device and shared by the first management device. In certain embodiments, the first IPMI related computer executable code is uploaded to the non-volatile memory of the computing device to form the first management device of the distributed management device in the computing device.

Certain aspects of the disclosure direct to a method for performing distributed Intelligent Platform Management Interface (D-IPMI) in a system. In certain embodiments, the method includes:

providing a distributed management device to a computing device, where the distributed management device includes:
- a first management device including a first processor, a system interface, and a first non-volatile memory storing first IPMI related computer executable code;
- at least one second management device including a second processor, an external interface, and a second non-volatile memory storing second IPMI related computer executable code; and
- a stack interface connecting the first management device and the at least one second management device to perform an internal communication between the first management device and the second management device;

performing, by the first IPMI related computer executable code executed at the first processor of the first management device, a plurality of time critical functions related to the computing device;

performing, by the second IPMI related computer executable code executed at the first processor of the at least one second management device, an external communication through the external interface;

performing, by the second IPMI related computer executable code executed at the second processor of the at least one second management device, a plurality of non-critical functions related to the computing device; and performing the internal communication between the first management device and the at least one second management device through a stack interface.

In certain embodiments, the time critical functions related to the computing device includes: performing system power control of the computing device; monitoring system components of the computing device and obtaining system information of the computing device; and performing a system communication with the computing device through the system interface.

In certain embodiments, each of the first management device and the at least one second management device is a system on a chip (SoC) physically separated from each other.

In certain embodiments, the system interface is an IPMI standardized interface, and the IPMI standardized interface includes a keyboard controller style (KCS) interface, a system management interface chip (SMIC) interface, and a block transfer (BT) interface.

In certain embodiments, the at least one second management device is configured to perform the external communication with a remote computing device through the external interface.

In certain embodiments, the stack interface is an Inter-Integrated Circuit (I2C) interface, a system management bus (SMB) interface, or a local area network (LAN).

In certain embodiments, the method further includes:

requesting, by the second IPMI related computer executable code executed at the second processor of the at least one second management device, the system information of the computing device from the first management device through the stack interface; and receiving, by the second IPMI related computer executable code executed at the second processor of the at least one second management device, the requested system information of the computing device from the first management device through the stack interface.

In certain embodiments, the first processor is an external processor of the computing device and shared by the first management device, and the first non-volatile memory is a non-volatile memory of the computing device and shared by the first management device. In certain embodiments, the method further includes: uploading the first IPMI related computer executable code to the non-volatile memory of the computing device to form the first management device of the distributed management device in the computing device.

Certain aspects of the disclosure direct to at least one non-transitory computer readable medium storing first Intelligent Platform Management Interface (IPMI) related computer executable code and second IPMI related computer executable code. The first IPMI related computer executable code, when executed at a first processor of a first management device of a distributed management device, is configured to: perform a plurality of time critical functions related to a computing device; and perform an internal communication with at least one second management device of the distributed management device through a stack interface. The second IPMI related computer executable code, when executed at a second processor of the at least one second management device of the distributed management device, is configured to: perform an external communication through an external interface; perform a plurality of non-critical functions related to the computing device; and perform the internal communication with the first management device through the stack interface. In certain embodiments, the second management device is physically separated from the first management device.

In certain embodiments, the time critical functions related to the computing device include: performing system power control of the computing device; monitoring system components of the computing device and obtaining system information of the computing device; and performing a system communication with the computing device through the system interface.

In certain embodiments, each of the first management device and the at least one second management device is a system on a chip (SoC) physically separated from each other.

In certain embodiments, the stack interface is an Inter-Integrated Circuit (I2C) interface, a system management bus (SMB) interface, or a local area network (LAN).

In certain embodiments, the second IPMI related computer executable code, when executed at the second processor, is further configured to: request the system information of the computing device from the first management device through the stack interface; and receive the requested system information of the computing device from the first management device through the stack interface.

In certain embodiments, the first processor is an external processor of the computing device and shared by the first management device, and the first non-volatile memory is a non-volatile memory of the computing device and shared by the first management device. In certain embodiments, the first IPMI related computer executable code is uploaded to the non-volatile memory of the computing device to form the first management device of the distributed management device in the computing device.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
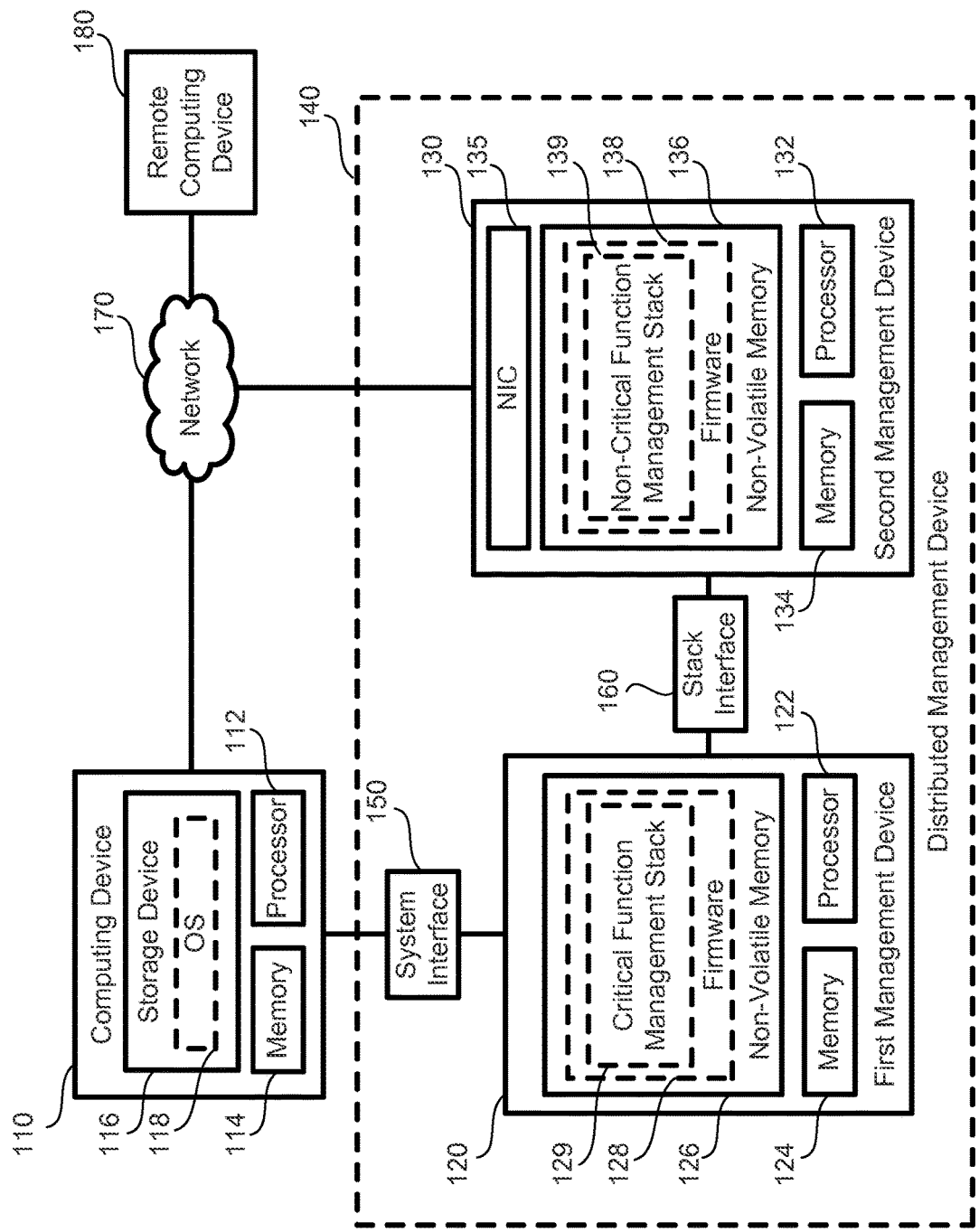
FIG. 1 schematically depicts a D-IPMI system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The terms "node" or "computing node", as used herein, generally refer to a basic unit of computer systems. A node may be implemented by a physical device or a virtual device. For example, a computing device such as a personal computer, a laptop computer, a tablet or a mobile device may function as a node. A peripheral device such as a printer, a scanner or a system on chip (SoC) may also function as a node. A virtual device, such as a virtual machine (VM), may also function as a node. When defining nodes on the Internet, a node refers to a device or a data point having an IP address.

The term "cluster", as used herein, generally refers to a set of loosely or tightly connected computing devices (or more precisely, computing nodes) that work together such that, in many respects, they can be viewed as a single system. The components of a cluster are usually connected to each other through a network, with each node of the cluster being set to perform certain tasks.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

One aspect of the present disclosure is directed to a distributed Intelligent Platform Management Interface (D-IPMI) system. As discussed above, with more IPMI based functionalities being put into the BMC, it becomes more challenging for all of the components running on the single BMC chip to meet the strict system requirements. In certain embodiments, for better performance, the D-IPMI system may include multiple management devices (such as multiple computer chips), in which one management devices maintains a certain subset of the BMC functionalities, and a different subset of the BMC functionalities may be offloaded to another management device. In other words, the D-IPMI system may include two or more split BMC stacks, which are physically separated as the multiple management devices, and each of the split BMC stacks may run on a separate processor in an individually separate management device. For example, one subset of the BMC functionalities may include system critical functionalities, such as functionalities related system power control, system component monitoring, system communication and time critical functions related to the host computer. The other subset of the BMC functionalities may include the rest of the complete BMC functionalities. Certain communication mechanisms between the management devices may be established between the different processors of the management devices, such that the BMC firmware portions running on each of the processor may collectively provide a single BMC stack representation to the external clients of the system. Thus, the workload of the system may be distributed among the management devices. Further, the system critical functionalities, which are generally time critical, may work within the given time constraints.

FIG. 1 schematically depicts a D-IPMI system according to certain embodiments of the present disclosure. The system 100 is capable of providing BMC functionalities in a plurality of split BMC stacks, with one subset of the BMC functionalities including time critical functions, and the other subset of the BMC functionalities including the rest of the non-critical functions. As shown in FIG. 1, the system 100 includes a computing device 110, a first management device 120, and a second management device 130. The first management device 120 and the second management device 130, collectively, functions as a distributed management device 140. In other words, the distributed management device 140 includes the first management device 120 and the second management device 130. The first management device 120 is connected to the computing device via a system interface 150. Further, the distributed management device 140 includes a stack interface 160, which connects the first management device 120 and the second management device 130. Moreover, the computing device 110 and the second management device 130 are communicatively interconnected by a network 170. The network 170 may be a wired or wireless network, and may be of various forms, such as a public network and a private network. Examples of the network 170 may include, but not limited to, a local area network (LAN) or wide area network (WAN) including the Internet. In certain embodiments, two or more different networks 170 may be applied such that the computing device 110 and the second management device 130 may be respectively connected to one or more of the different networks 170. In certain embodiments, for example, the system 100 may include three types of network 170: a heartbeat network, the Internet, and a virtual machine network. A remote computing device 180 is also connected to the network 170.

The computing device 110 serves as a host computer of the distributed management device 140. In certain embodiments, the computing device 110 may be a general purpose computer server system or a headless server. Examples of the computing device 110 may include, but not limited to, a personal computer, a desktop computer, a laptop computer, a personal digital assistant (PDA), a tablet device, a mobile device, or any other computing devices that may function as the host computer. In certain embodiments, the computing device 110 may function as a server or a client in a client-server system.

In certain embodiments, the computing device 110 may include necessary hardware and software components to perform certain predetermined tasks. For example, as shown in FIG. 1, the computing device 110 has a processor 112, a memory 114, a storage device 116, and any other necessary hardware components enabling the computing device 110 to operate.

The processor 112 is configured to control operation of the computing device 110. In certain embodiments, the processor 112 may be a central processing unit (CPU). The processor 112 can execute any computer executable code or instructions, such as an operating system (OS) 118, or other applications of the computing device 110. In certain embodiments, the computing device 110 may run on more than one processor, such as two processors, four processors, eight processors, or any suitable number of processors.

The memory 114 may be a volatile memory, such as the random-access memory (RAM), for storing the data and information during the operation of the computing device 110. In certain embodiments, the memory 114 may be a volatile memory array.

The storage device 116 is a non-volatile data storage media for storing the OS 118 and other applications (not shown) of the computing device 110. The storage device 116 may store the OS 118 and any other necessary software or firmware components in the form of computer executable code or instructions, which may be executed at the processor 112.

In certain embodiments, the distributed management device 140 has two management devices, including the first management device 120 and the second management device 130. In certain embodiments, the distributed management device 140 may include more than two management devices. For example, the distributed management device 140 may include one first management device 120 and two or more second management devices 130, or may include two or more first management devices and one second management device 130. In certain embodiments, the distributed management device 140 may include two or more first management devices 120 and two or more second management devices 130.

The first management device 120 is the management device that includes one subset of the BMC functionalities to control time critical functionalities. In certain embodiments, the first management device 120 may be a system on a chip (SoC). As shown in FIG. 1, the first management device 120 has a processor 122, a memory 124, a non-volatile memory 126 storing the firmware 128 therein, and any other necessary hardware components enabling the first management device 120 to operate. Further, the system interface 150 may be a part of the first management device 120. In certain embodiments, the system interface 150 may be an IPMI standardized interface, which may include, without being limited to, a keyboard controller style (KCS) interface, a system management interface chip (SMIC) interface, and a block transfer (BT) interface.

The processor 122 is configured to control operation of the first management device 120. In certain embodiments, the processor 122 may be a CPU. The processor 122 can execute any computer executable code or instructions, such as the firmware 128 stored in the non-volatile memory 126, or other software or firmware applications of the first management device 120. In certain embodiments, the first management device 120 may run on more than one processor, such as two processors, four processors, eight processors, or any suitable number of processors.

The memory 124 can be a volatile memory, such as the RAM, for storing the data and information during the operation of the first management device 120. In certain embodiments, the memory 124 may be a volatile memory array.

The non-volatile memory 126 is a non-volatile data storage media for storing the firmware 128 and any other necessary software or firmware components of the first management device 120. Examples of the non-volatile memory 126 may include flash memory, memory cards, USB drives, hard drives, floppy disks, optical drives, or any other types of data storage devices. As shown in FIG. 1, the firmware 128 includes a critical function management stack 129, which includes first IPMI related computer executable code or instructions that may be executed at the processor 122 to perform a plurality of time critical functions related to the computing device 110. For example, one of the time critical functions may include performing system power control of the computing device 110. In addition, one of the time critical functions may include monitoring system components of the computing device 110 and obtaining system information of the computing device 110. Moreover, one of the time critical functions may include performing a system communication with the computing device 110 through the system interface 150.

As disclosed above, in certain embodiments, the first management device 120 may be a SoC. Examples of the BMC related SoC may include Pilot or Aspeed. In this case, the processor 122 of the first management device 120 may be a secondary processor built into the SoC, which is a separate controller. In other words, the first management device 120 is thus independent from the computing device 110 without sharing any resources of the computing device 110. Alternatively, in certain embodiments, the first management device 120 may be implemented by components of the computing device 110. For example, the processor 122 may be an external processor (the term "external" means that the processor is not originally an integral part of the distributed management device 140) of the computing device 110, which is shared by the first management device 120. In this case, the non-volatile memory 124 may also be a non-volatile memory of the computing device 110, which is shared by the first management device 120. In this case, the resources of the computing device 110 are shared by the first management device 120. One example of such configuration is the concept of Innovation Engine introduced by Intel Corporation, which provides a new microarchitecture linked with silicon process technology. In the model proposed by Intel, a common processor architecture is provided with multiple complete execution cores in one physical processor. Thus, the different execution cores of the processor may be used to run different code or instructions to provide certain functionalities independently.

Figure 2:
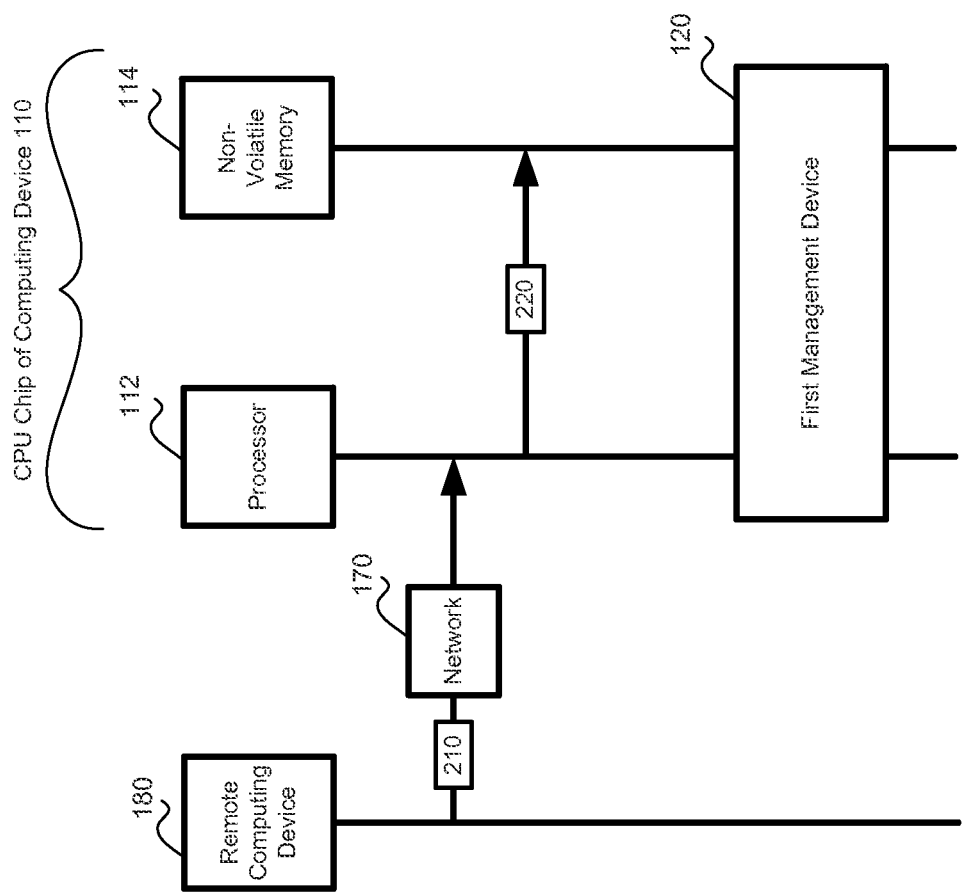
FIG. 2 schematically depicts a configuration process of the first management device using an external processor of the computing device having multiple execution cores according to certain embodiments of the present disclosure.

FIG. 2 schematically depicts a configuration process of the first management device using an external processor of the computing device having multiple execution cores according to certain embodiments of the present disclosure. Using the processor 112 of the computing device 110 as an example, the processor 112 and the non-volatile memory 114 of the computing device 110 may be formed as a CPU chip. Thus, at procedure 210, a system administrator of the system 100 may upload the first IPMI related computer executable code or instructions (i.e., the critical function management stack 129) to the processor 112 of the CPU chip of the computing device 110 from, for example, a remote computing device 180 through the network 170. Then, at procedure 220, the uploaded first IPMI related computer executable code or instructions are stored in a reserved area (e.g., the non-volatile memory 114) of the CPU chip. In this case, one execution core of the processor 112 and the reserved area (e.g., the non-volatile memory 114) of the CPU chip may be used to form the first management device 120 of the distributed management device 140 in the computing device 110, and the other execution core of the processor 112 may perform operation of the computing device 110. Since the two execution cores may operate independently, the first management device 120 may operate independently from the operation of the computing device 110. Further, since both execution cores are provided in the same physical processor 112, it may be easier for the first management device 120 (which is implemented by one of the execution cores) to perform the time critical functions, such as performing system power control of the computing device 110, monitoring system components of the computing device 110, obtaining system information of the computing device 110, and performing system communication with the computing device 110.

The second management device 130 is the management device that includes the other subset of the BMC functionalities to control non-critical functionalities. In certain embodiments, the second management device 130 may also be a SoC, which is physically separated from the first management device 120. In certain embodiments, the second management device 130 may or may not have identical hardware components to the first management device 120. As shown in FIG. 1, the second management device 130 has a processor 132, a memory 134, a network interface card (NIC) 135, a non-volatile memory 136 storing the firmware 138 therein, and any other necessary hardware components enabling the second management device 130 to operate. In certain embodiments, although not shown in FIG. 1, the second management device 130 may also be connected to the system interface 150 such that the second management device 130 may have access to the computing device 110.

The processor 132 is configured to control operation of the second management device 130. In certain embodiments, the processor 132 may be a central processing unit (CPU). The processor 132 can execute any computer executable code or instructions, such as the firmware 138 stored in the non-volatile memory 136, or other software or firmware applications of the second management device 130. In certain embodiments, the second management device 130 may run on more than one processor, such as two processors, four processors, eight processors, or any suitable number of processors.

The memory 134 can be a volatile memory, such as the RAM, for storing the data and information during the operation of the second management device 130. In certain embodiments, the memory 134 may be a volatile memory array.

The NIC 135, sometimes referred to as a network interface controller, is a computer hardware component that functions as an external interface, which may be used to connect the second management device 130 to the network 170. As shown in FIG. 1, the second management device 130 includes one NIC 135. In certain embodiments, each of the first management device 120 and the second management device 130 may include one or more NICs. For example, when the system 100 includes multiple networks 170, each of the first management device 120 and the second management device 130 may require multiple NICs, such that they may be respectively connected to the different networks 170 via each of the NICs. In this case, each of the NICs of the first management device 120 and the second management device 130 may either function as an external interface or an internal interface of the distributed management device 140. For each of the first management device 120 and the second management device 130, the number of the NICs may be determined based on the types of network being provided in the system 100.

The non-volatile memory 136 is a non-volatile data storage media for storing the firmware 138 and any other necessary software or firmware components of the second management device 130. Examples of the non-volatile memory 136 may include flash memory, memory cards, USB drives, hard drives, floppy disks, optical drives, or any other types of data storage devices. As shown in FIG. 1, the firmware 138 includes a non-function management stack 139, which includes second IPMI related computer executable code or instructions that may be executed at the processor 132 to perform a plurality of non-critical functions related to the computing device 110. Specifically, the non-critical functions are functions that are not as time essential as the time critical functions performed by the first management device 120. In other words, among all BMC functionalities, the functions that are not the time critical functions performed by the first management device 120 may be categorized as the non-critical functions. In certain embodiments, the non-critical functions may include may include performing an external communication with the remote computing device 180 via the network 170 through the NIC 135 (i.e., the external interface of the second management device 130). For example, the non-function management stack 139 may be used to provide a web server and its related management functions, which may be used to perform a variety of BMC functionalities using a web connection through the network 170.

In certain embodiments, the firmware 128 (including the first IPMI related computer executable code or instructions) and the firmware 138 (including the second IPMI related computer executable code or instructions) may each have the flat liner code or a thin real-time OS (RTOS) based firmware, depending upon the level of abstraction of the functionalities of the time critical functions and non-critical functions.

The stack interface 160 is provided to connect the first management device 120 and the second management device 130 to perform an internal communication between the first management device 120 and the second management device 130. In certain embodiments, the internal communication may be an IPMI based communication, or may be a communication under any other data exchange protocols or self-defined data exchange models. In certain embodiments, the stack interface 160 may be an Inter-Integrated Circuit (I2C) interface, a system management bus (SMB) interface, a local area network (LAN), or any other physical interface or medium. In certain embodiments, each of the first management device 120 and the second management device 130 may respectively perform the internal communications with each other through the stack interface 160.

Figure 3:
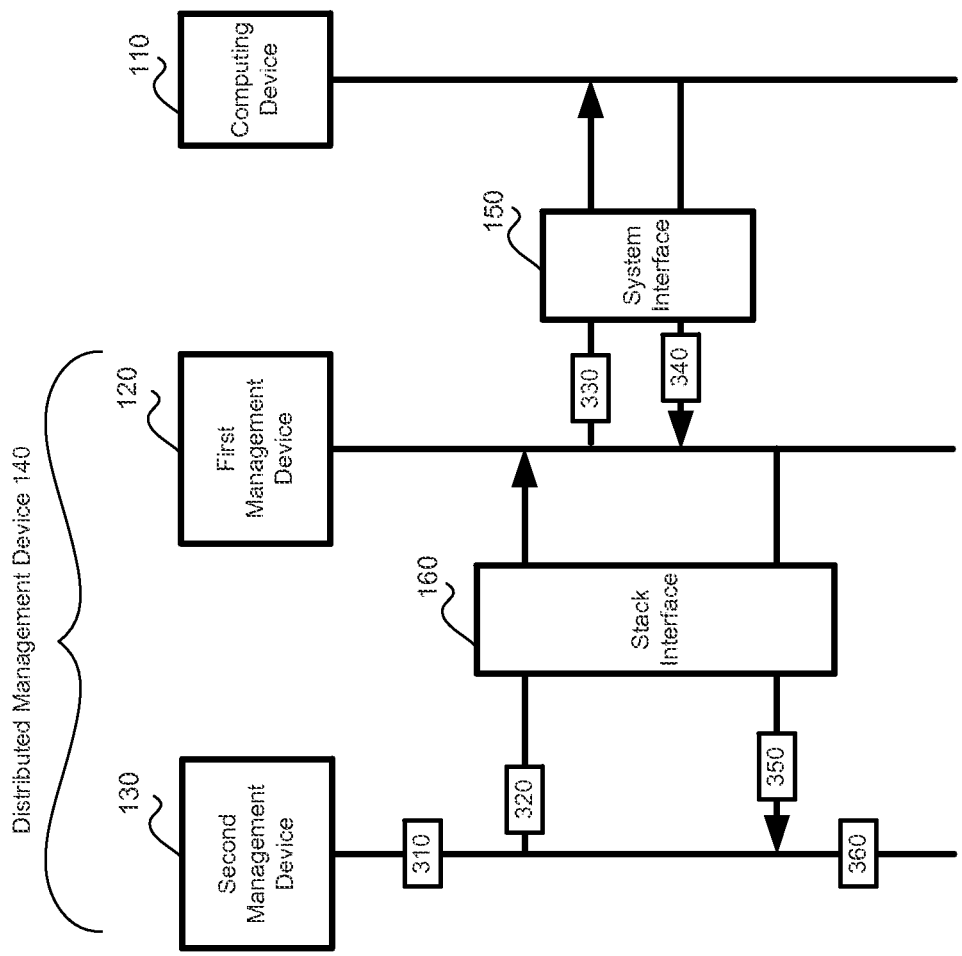
FIG. 3 schematically depicts an internal communication between the first management device and the second management device according to certain embodiments of the present disclosure.

FIG. 3 schematically depicts an internal communication between the first management device and the second management device according to certain embodiments of the present disclosure. In this embodiment, the distributed management device 140 includes one first management device 120 and one second management device 130 with the stack interface 160 interconnecting the two management devices, and only the first management device 120 is connected to the computing device 110 through the system 150. In certain embodiments, the internal communication may be an IPMI based communication, or may be a communication under any other data exchange protocols or self-defined data exchange models.

At procedure 310, when the firmware 138 of the second management device 130 is executing, the second IPMI related computer executable code or instructions (i.e., the non-critical function management stack 139) may perform one of the non-critical functions that requires certain system information of the computing device 110. In this case, at procedure 320, the firmware 138 may perform the internal communication with the first management device 120 through the stack interface 160 to request the required system information of the computing device 110 from the first management device 120. When the first management device 120 receives the request, at procedure 330, the firmware 128 of the first management device 120 performs the time-critical functions to request the system information of the computing device 110. At procedure 340, the firmware 128 of the first management device 120 obtains the requested system information. It should be noted that, in certain embodiments, the firmware 128 of the first management device 120 may already have obtained the required system information of the computing device 110. In this case, the procedure 330 may be omitted.

Then, at procedure 350, the firmware 128 may perform the internal communication with the second management device 130 through the stack interface 160 to send the system information to the second management device 130. Thus, at procedure 360, the firmware 138 of the second management device 130 may receive the requested system information of the computing device 110 from the first management device 120 through the stack interface 160, and then use the requested system information to perform the corresponding functions.

As described above, the two management devices of the distributed management device 140 may be synchronized by communicating over the connection using the stack interface 160. The first management device 120 may handle the time critical aspects of the BMC, such as handling local system interfaces and system power control of the computing device 110. Meanwhile, the second management device 130 may be used to support the rest of the non-critical functionalities of the BMC, such as server management functions.

With the D-IPMI system 100, the two management devices are physically separated and operated individually in the distributed way, so the first management device 120 may be used to implement quick, tightly controlled functionalities to help resolving system contention issues. For example, when the computing device 110 is a server, there will be an advantage to reduce the time taken by the server in booting before the first video screen of the server appears. In this case, the first management device 120 may be used to implement quick, tightly controlled server bring-up sequence to speed up the server boot time tremendously.

Further, the D-IPMI system 100 may help in simplifying the complex server system designs in certain cases. For example, in a system, certain system information may be easily available in a certain part of the hardware components of the system, and the other system information may be more easily accessible in a different part of the system. By distributing the management devices into two or more devices each having an individually operable stack, the whole distributed management device 140 may still provide the same common IPMI based server management solution, which make be used to easily take care of complex server management requirements.

A further aspect of the present disclosure is directed to a method for performing distributed IPMI in a system. In certain embodiments, the method includes: providing a distributed management device 140 as shown in FIG. 1 to a computing device 110, where the computing device 110 functions as a host computer. In this case, the first IPMI related computer executable code executed at the first processor 122 of the first management device 120 may be used to perform a plurality of time critical functions related to the computing device 110, and the second IPMI related computer executable code executed at the second processor 132 of the second management device 130 may be used to perform an external communication through the external interface, and to perform a plurality of non-critical functions related to the computing device 110. For example, the time critical functions may include performing system power control of the computing device 110; monitoring system components of the computing device 110 and obtaining system information of the computing device 110; and performing a system communication with the computing device 110 through the system interface 150. Further, an internal communication may be performed between the first management device 120 and the at least one second management device 130 through the stack interface 160.

In certain embodiments, each of the first management device 120 and the second management device 130 may be a SoC physically separated from each other.

In a further aspect, the present disclosure is related to at least one non-transitory computer readable medium storing the first IPMI related computer executable code and second IPMI related computer executable code respectively. The first and second IPMI related computer executable code may be respectively executed at one or more processor of the first management device 120 and the second management device 130 to perform the corresponding functions as described above. In certain embodiments, the non-transitory computer readable medium may include, but not limited to, any physical or virtual storage media. In certain embodiments, the non-transitory computer readable medium may be implemented as the non-volatile memory 126 of the first management device 120 and the non-volatile memory 136 of the second management device 130 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A distributed Intelligent Platform Management Interface (D-IPMI) system, comprising:
    a computing device; and
    a distributed management device, comprising:
        a first management device comprising a first processor, a system interface, and a first non-volatile memory storing first IPMI related computer executable code;
        at least one second management device comprising a second processor, an external interface, and a second non-volatile memory storing second IPMI related computer executable code; and
        a stack interface connecting the first management device and the at least one second management device to perform an internal communication between the first management device and the second management device;
    wherein the first IPMI related computer executable code, when executed at the first processor, is configured to:
        perform a plurality of time critical functions related to the computing device; and
        perform the internal communication with the at least one second management device through the stack interface;
    wherein each of the at least one second management device is a system on a chip (SoC) physically separated from the first management device, and the second IPMI related computer executable code, when executed at the second processor of the SoC as the at least one second management device, is configured to:
        perform an IPMI related external communication through the external interface;
        perform a plurality of non-critical IPMI related functions related to the computing device; and
        perform the internal communication with the first management device through the stack interface.

2. The system as claimed in claim 1, wherein the time critical functions related to the computing device comprise:
    performing system power control of the computing device;
    monitoring system components of the computing device and obtaining system information of the computing device; and
    performing a system communication with the computing device through the system interface.

3. The system as claimed in claim 1, wherein the first management device is another SoC.

4. The system as claimed in claim 1, wherein the system interface is an IPMI standardized interface.

5. The system as claimed in claim 4, wherein the IPMI standardized interface is a keyboard controller style (KCS) interface, a system management interface chip (SMIC) interface, or a block transfer (BT) interface.

6. The system as claimed in claim 1, wherein the second IPMI related computer executable code, when executed at the second processor, is configured to perform the external communication with a remote computing device through the external interface.

7. The system as claimed in claim 1, wherein the stack interface is an Inter-Integrated Circuit (I2C) interface, a system management bus (SMB) interface, or a local area network (LAN).

8. The system as claimed in claim 1, wherein the second IPMI related computer executable code, when executed at the second processor, is further configured to:
    request the system information of the computing device from the first management device through the stack interface; and
    receive the requested system information of the computing device from the first management device through the stack interface.

9. The system as claimed in claim 1, wherein the first processor is an external processor of the computing device and shared by the first management device, and the first non-volatile memory is a non-volatile memory of the computing device and shared by the first management device.

10. The system as claimed in claim 9, wherein the first IPMI related computer executable code is uploaded to the non-volatile memory of the computing device to form the first management device of the distributed management device in the computing device.

11. A method for performing distributed Intelligent Platform Management Interface (D-IPMI) in a system, the method comprising:
   providing a distributed management device to a computing device, the distributed management device comprising:
      a first management device comprising a first processor, a system interface, and a first non-volatile memory storing first IPMI related computer executable code;
      at least one second management device comprising a second processor, an external interface, and a second non-volatile memory storing second IPMI related computer executable code, wherein each of the at least one second management device is a system on a chip (SoC) physically separated from the first management device; and
      a stack interface connecting the first management device and the at least one second management device to perform an internal communication between the first management device and the second management device;
   performing, by the first IPMI related computer executable code executed at the first processor of the first management device, a plurality of time critical functions related to the computing device;
   performing, by the second IPMI related computer executable code executed at the second processor of the SoC as the at least one second management device, an IPMI related external communication through the external interface;
   performing, by the second IPMI related computer executable code executed at the second processor of the SoC as the at least one second management device, a plurality of IPMI related non-critical functions related to the computing device; and
   performing the internal communication between the first management device and the at least one second management device through the stack interface.

12. The method as claimed in claim 11, wherein the time critical functions related to the computing device comprise:
   performing system power control of the computing device;
   monitoring system components of the computing device and obtaining system information of the computing device; and
   performing a system communication with the computing device through the system interface.

13. The method as claimed in claim 11, wherein the first management device is another SoC.

14. The method as claimed in claim 11, wherein the system interface is an IPMI standardized interface, and wherein the IPMI standardized interface is a keyboard controller style (KCS) interface, a system management interface chip (SMIC) interface, or a block transfer (BT) interface.

15. The method as claimed in claim 11, wherein the stack interface is an Inter-Integrated Circuit (I2C) interface, a system management bus (SMB) interface, or a local area network (LAN).

16. The method as claimed in claim 11, further comprising:
   requesting, by the second IPMI related computer executable code executed at the second processor of the at least one second management device, the system information of the computing device from the first management device through the stack interface; and
   receiving, by the second IPMI related computer executable code executed at the second processor of the at least one second management device, the requested system information of the computing device from the first management device through the stack interface.

17. The method as claimed in claim 11, wherein the first processor is an external processor of the computing device and shared by the first management device, and the first non-volatile memory is a non-volatile memory of the computing device and shared by the first management device.

18. The method as claimed in claim 17, further comprising:
   uploading the first IPMI related computer executable code to the non-volatile memory of the computing device to form the first management device of the distributed management device in the computing device.

19. At least one non-transitory computer readable medium storing first Intelligent Platform Management Interface (IPMI) related computer executable code and second IPMI related computer executable code,
   wherein the first IPMI related computer executable code, when executed at a first processor of a first management device of a distributed management device, is configured to:
      perform a plurality of time critical functions related to a computing device; and
      perform an internal communication with at least one second management device of the distributed management device through a stack interface, wherein each of the at least one second management device is a system on a chip (SoC) physically separated from the first management device;
   wherein the second IPMI related computer executable code, when executed at a second processor of the SoC as the at least one second management device of the distributed management device, is configured to:
      perform an IPMI related external communication through an external interface;
      perform a plurality of IPMI related non-critical functions related to the computing device; and
      perform the internal communication with the first management device through the stack interface;
   wherein the second management device is physically separated from the first management device.

20. The non-transitory computer readable medium as claimed in claim 19, wherein the time critical functions related to the computing device comprise:
   performing system power control of the computing device;
   monitoring system components of the computing device and obtaining system information of the computing device; and
   performing a system communication with the computing device through the system interface.

21. The non-transitory computer readable medium as claimed in claim 19, wherein the first management device is another SoC.

22. The non-transitory computer readable medium as claimed in claim 19, wherein the stack interface is an Inter-Integrated Circuit (I2C) interface, a system management bus (SMB) interface, or a local area network (LAN).

23. The non-transitory computer readable medium as claimed in claim 19, wherein the second IPMI related computer executable code, when executed at the second processor, is further configured to:
   request the system information of the computing device from the first management device through the stack interface; and
   receive the requested system information of the computing device from the first management device through the stack interface.

24. The non-transitory computer readable medium as claimed in claim 19, wherein the first processor is an external processor of the computing device and shared by the first management device, and the first non-volatile memory is a non-volatile memory of the computing device and shared by the first management device.

25. The non-transitory computer readable medium as claimed in claim 24, wherein the first IPMI related computer executable code is uploaded to the non-volatile memory of the computing device to form the first management device of the distributed management device in the computing device.

* * * * *